March 31, 1931. D. HARSTON 1,798,794
HIGHWAY FOOT CYCLE
Filed Sept. 24, 1929

Dan Harston
INVENTOR
BY John M. Spellman
ATTORNEY

Patented Mar. 31, 1931

1,798,794

UNITED STATES PATENT OFFICE

DAN HARSTON, OF DALLAS, TEXAS, ASSIGNOR OF ONE-THIRD TO JOHN M. SPELLMAN, ONE-THIRD TO G. E. HUBBARD, AND ONE-THIRD TO DEAN THURMOND, ALL OF DALLAS, TEXAS

HIGHWAY FOOT CYCLE

Application filed September 24, 1929. Serial No. 394,890.

This invention has for its primary object to provide a new and novel form of locomotion for individuals for travel and amusement and has more pertinent reference to the particular arrangement and construction thereof.

More particularly the invention has for its object the provision of a highway foot cycle, constructed in pairs, one for each foot and worn or attached to the individual's footwear.

Another object of the invention is to provide a foot cycle having three wheels, the wheels being provided with a soft resilient tread, and further to provide a frame of exceptional strength and ease of assembly with the cycle parts.

With the above and other and further objects in view the invention will be fully understood from a perusal of the following detailed description taken in connection with the accompanying drawings and wherein.

Figure 1:
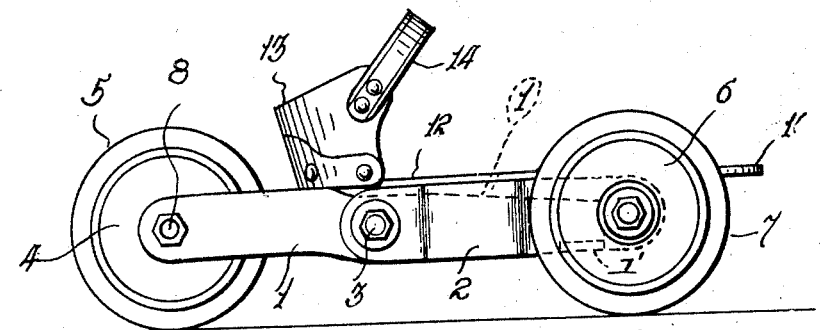
Figure 1 represents a side elevational view of the foot cycle.
Figure 2:
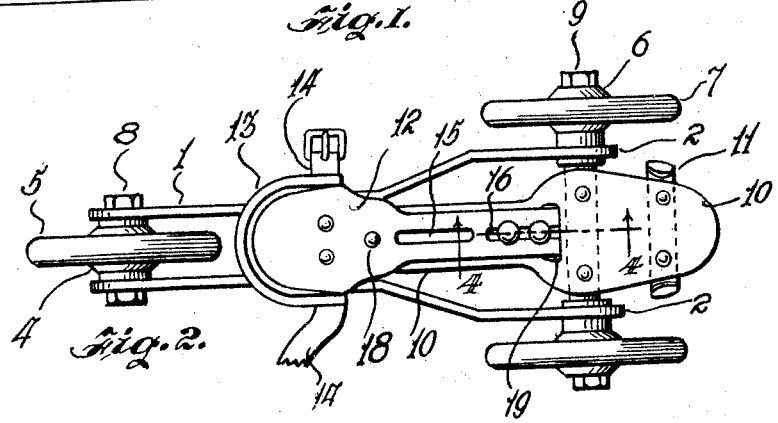
Figure 2 is a top plan view.
Figure 3:
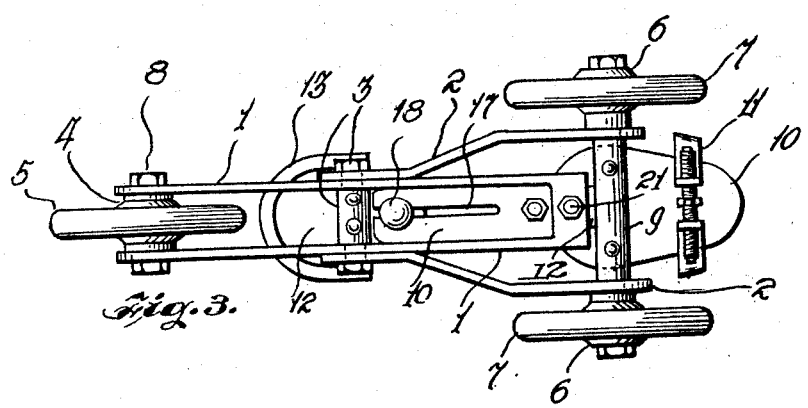
Figure 3 is a bottom plan view.
Figure 4:
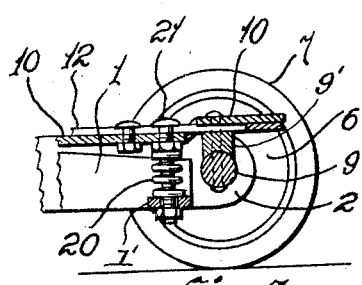
Figure 4 is a detail sectional view taken on the line 4—4 of Figure 2.

Proceeding in accordance with the drawings, the invention consists of a steel frame consisting of a rear part 1 and a front part 2, hingedly connected by a bolt 3.

The frame part 1 includes a wheel 4 with resilient tread or tire 5 and the front part 2 of the frame includes similar wheels 6 with like tires 7. The front wheels and rear wheels may be of any size or diameter from two inches or over.

The rear wheel is carried on an axle 8 and the front wheels are mounted on an axle 9 carrying a block 9' with a slot in its upper face and bolted to the front axle is a plate 10 including adjustable clamp members 11 for connection to the shoe sole.

Another plate 12 carries a heel bracing and supporting member 13 which has straps 14 for attaching to the shoe at this point. The heel plate 12 is bradded or otherwise secured to the bolt 3 and includes slots 15 and 16. The plate 10 has a slot 17 which is in alinement with a brad or other means 18 carried on the heel plate for engagement of the two plates. The forward part of the plate 12 is inserted in an opening 19 in the plate 10 and in the slot in the block 9' and a spring 20 is carried on a bolt 21. The spring 20 is supported upon a cross-piece 1' of the frame member 1.

The invention while disclosing a practical working embodiment is capable of modifications, such as the single wheel having a pivotal support and likewise the frame parts may be of an oscillating type.

What is claimed as new is:

A highway foot cycle comprising a frame of two members overlapping each other and pivotally connected to a bolt; an axle and a pair of wheels mounted in the forward part of one of said frame members and a single wheel and axle mounted in the rear portion of said other frame member; a block supported upon the front axle and provided with a slot, a plate mounted upon the block and adapted to support the ball of the foot and including a slot; a plate carrying a heel bracing element and connected to the rear portion of said forward frame member, both plates interlocking one with the other, in combination with a heel strap and a shoe engaging and adjustable element.

In testimony whereof I affix my signature.

DAN HARSTON.